(12) United States Patent
Kato et al.

(10) Patent No.: US 11,781,978 B2
(45) Date of Patent: Oct. 10, 2023

(54) SPECTROSCOPIC MEASUREMENT DEVICE

(71) Applicant: Nippon Telegraph and Telephone Corporation, Tokyo (JP)

(72) Inventors: Keiko Kato, Tokyo (JP); Hiroki Mashiko, Tokyo (JP); Katsuya Oguri, Tokyo (JP); Hideki Goto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 9 days.

(21) Appl. No.: 17/633,881

(22) PCT Filed: Aug. 28, 2019

(86) PCT No.: PCT/JP2019/033652
§ 371 (c)(1),
(2) Date: Feb. 8, 2022

(87) PCT Pub. No.: WO2021/038743
PCT Pub. Date: Mar. 4, 2021

(65) Prior Publication Data
US 2022/0276158 A1 Sep. 1, 2022

(51) Int. Cl.
*G01N 21/3504* (2014.01)
*G01J 3/02* (2006.01)
*G01J 3/42* (2006.01)

(52) U.S. Cl.
CPC ........ *G01N 21/3504* (2013.01); *G01J 3/0208* (2013.01); *G01J 2003/423* (2013.01); *G01N 2201/06113* (2013.01)

(58) Field of Classification Search
CPC ..... G01N 21/3504; G01N 2201/06113; G01N 2021/1725; G01N 2021/335; G01N 21/33; G01J 3/0208; G01J 2003/423; G01J 3/0205; G01J 3/0224; G01J 3/0232; G01J 3/0286; G01J 3/10; G01J 3/42; G01J 3/433; G02F 1/37; H01S 3/00
See application file for complete search history.

(56) References Cited

U.S. PATENT DOCUMENTS

| | | | |
|---|---|---|---|
| 5,706,094 A | 1/1998 | Maris | |
| 2012/0287428 A1* | 11/2012 | Tamada | G01J 3/44 356/301 |
| 2017/0336259 A1* | 11/2017 | Kawada | G01J 3/0224 |

FOREIGN PATENT DOCUMENTS

| | | | |
|---|---|---|---|
| CN | 1295561 C | * | 1/2007 |
| JP | H11511240 A | | 9/1999 |

OTHER PUBLICATIONS

English Translation of CN1295561C Description (Year: 2007).*
(Continued)

*Primary Examiner* — Tarifur R Chowdhury
*Assistant Examiner* — Akbar Hassan Rizvi
(74) *Attorney, Agent, or Firm* — Slater Matsil, LLP

(57) ABSTRACT

A spectroscopic measurement apparatus includes a pulsed laser light source that emits pulsed laser light, a beam splitter that splits the pulsed laser light into pump light and probe light, a delay circuit that changes a delay time of the pump light with respect to the probe light, a chopper that intensity-modulates the pump light, a wavelength converter that wavelength-converts the probe light into vacuum ultraviolet light, an optical system that guides the pump light and the wavelength-converted probe light to a sample, and a detector that detects the probe light reflected by the sample.

12 Claims, 6 Drawing Sheets

(56) References Cited

OTHER PUBLICATIONS

Cirri, A. et al., "Achieving Surface Sensitivity in Ultrafast XUV Spectroscopy: M2,3-Edge Reflection-Absorption of Transition Metal Oxides," The Journal of Physical Chemistry C, 2017, 9 pages.
Hokkaido University, "Pump probe," Pump Probe Spectroscopy, Photophysical Properties Laboratory, Faculty of Science, Jul. 4, 2019, 7 pages.
Jasco, "Basics of FTIR (2) Principle of FTIR Difference between distributed type and Fourier transform type (FTIR) infrared spectrophotometer" Japan Spectroscopy Co., Ltd., Jul. 4, 2019, 7 pages.
Kimura, S. et al., "Design of a high resolution and high flux beam line for VUV angle-resolved photoemission at UVSOR-II," ResearchGate, Feb. 22, 2007 5 pages.
Tahara Group, "Observation of coherent nuclear motion in ultrafast photochemical reactions," Riken Tahara Molecular Spectroscopy Laboratory, Jul. 4, 2019, 5 pages.

* cited by examiner

Fig. 1

SPECTROSCOPIC MEASUREMENT DEVICE

This patent application is a national phase filing under section 371 of PCT application no. PCT/JP2019/033652, filed on Aug. 28, 2019, which application is hereby incorporated herein by reference in its entirety.

TECHNICAL FIELD

The present invention relates to a tabletop high energy resolution spectroscopic measurement apparatus in a vacuum ultraviolet region.

BACKGROUND

Interactions between light and materials have been systematically studied and the response of atoms and molecules to light irradiation has been found in a wide wavelength range.

Apparatuses for observing various quantum states (regarding electrons, vibrations, or rotations) include (I) a dispersion type apparatus using a continuous light source with a narrow energy width and (II) an interference type apparatus using light with a wide energy width (see NPL 1). FIG. 4 is a block diagram illustrating a configuration of the dispersion type spectroscopic measurement apparatus disclosed in NPL 1 and FIG. 5 is a block diagram illustrating a configuration of the interference type spectroscopic measurement apparatus disclosed in NPL 1.

In the dispersion type spectroscopic measurement apparatus, light that has passed through a sample 100 to be measured is dispersed by a diffraction grating 101 and each wavelength is sequentially detected by a detector 102 as illustrated in FIG. 4. In FIG. 4, 103 denotes a light source, 104 denotes a sample on a reference side, 105 to 109 denote mirrors, and 110 denotes a sector mirror for alternately sending light transmitted through the sample 100 and light transmitted through the sample 104 on the reference side to the detector 102. A signal (transmittance or absorbance) detected from the sample is plotted as a function of wavelength or wavenumber and displayed as a graph. The obtained graph is called a spectrum and shows a pattern specific to the material. The natural frequencies of quantum states can be obtained from peak frequencies of the spectrum and the lifetimes of the quantum states can be obtained from the line widths of the peaks. The energy resolution of the dispersion type spectroscopic measurement apparatus is determined by the diffraction grating 101.

The interference type spectroscopic measurement apparatus uses an interferometer as illustrated in FIG. 5. Specifically, light emitted from a light source 200 is split into two optical paths by using a beam splitter 201. The light reflected by the beam splitter 201 travels toward a movable mirror 202 and the light transmitted through the beam splitter 201 travels toward a fixed mirror 203. The movable mirror 202 moves in a direction of an arrow 204 with time. The light beams reflected by the movable mirror 202 and the fixed mirror 203 return to the beam splitter 201 and thus interfere with each other. A detector 206 detects the interference light that has passed through a sample 205. A spectrum can be obtained by Fourier-transforming the output of the detector 206 and calculating each wavelength component with a computer. In the case of the interference type, the energy resolution can be improved by increasing the moving distance of the interferometer.

The interference type can further employ a pump-probe method using ultrashort pulsed light with a short time width as a light source to acquire the natural frequency and time information (relaxation time and phase) of each quantum state (see NPL 2). FIG. 6 is a block diagram illustrating a configuration of a spectroscopic measurement apparatus disclosed in NPL 2.

The pump-probe method is a method of measuring the optical constant of a sample in an excited state by probe light after exciting the sample by pump light. In the spectroscopic measurement apparatus illustrated in FIG. 6, pulsed light from a mode-locked laser 300 is split into pump light 302 and probe light 303 by a half mirror 301. The pump light 302 is incident on a sample 308 via a mirror 304, a shaker 305, a mirror 306, and a lens 307. The shaker 305 periodically changes the optical path length of the pump light 302 by vibrating in a direction of an arrow 309. On the other hand, the probe light 303 is incident on the sample 308 via a stage 310, a half-wave plate 311, a half mirror 312, and the lens 307. The probe light 303 reflected by the sample 308 passes through the half mirror 312 and is incident on a detector 313. A part of the probe light 303 that is incident on the half mirror 312 via the half-wave plate 311 passes through the half mirror 312 and is incident on a detector 315 via a mirror 314.

In the pump probe method, a superposition state (a wave packet) can be created by pump light when the energy width of the light irradiating the sample is greater than the energy interval $h\Omega$ (where h is the Dirac constant and $\Omega$ is the angular frequency) between adjacent quantum states. Because the wave packet modulates the optical constant of the sample at a period determined by $h\Omega$, the natural frequency ($h\Omega$) and lifetime of each quantum state can be determined by analyzing the vibrational structure of the probe light obtained from the sample ($h\Omega$) (see NPL 3).

The apparatuses illustrated in FIGS. 4 to 6 have been used to evaluate the physical properties of various materials in the infrared/visible region for which sufficient light sources and optical elements are provided. However, in the case of the vacuum ultraviolet (VUV) region, measurements are mostly performed by the dispersion type due to limitations on optical elements that can be used. The VUV region is light having wavelengths of 200 nm to 10 nm, and is an energy region corresponding to outer shell excitation, first ionization energy to inner shell excitation, and inner shell ionization of atoms and molecules. Electron-excited states such as a Rydberg state, a two-electron excited state, an automatic ionization state, and an inner shell excited state can be observed in the VUV region. These highly excited states can be observed with the advent of synchrotron radiation facilities that can supply high-intensity VUV light and have been extensively studied so far.

In the case of spectroscopic measurement, the energy resolution of the spectrum depends on the size of the diffraction grating and the spectroscope. For example, a large spectroscope of 10 m is required to obtain an energy resolution of 0.5 meV for incident light of 20 eV (see NPL 4). Further, a high-intensity VUV light source is necessary to obtain signals with such a high energy resolution and spectroscopic measurement cannot be easily performed in a laboratory.

CITATION LIST

Non Patent Literature

NPL 1: "Basics of FTIR, (2) Principles of FTIR: Difference between dispersive and Fourier transform infrared (FTIR) spectrophotometers," JASCO Corporation, [Retrieved Aug. 13, 2019], Internet <https://www.jasco.co.jp/jpn/technique/internet-seminar/ftir/ftir2.html>.

NPL 2: "Pump Probe," Photophysical Properties Laboratory, Faculty of Science, Hokkaido University, [Retrieved Aug. 13, 2019], Internet <http://phys.sci.hokudai.ac.jp/LABS/hikari/pump/pump.html>.

NPL 3: "Observation of Coherent Nuclear Motion in Ultrafast Photochemical Reactions," RIKEN Tahara Molecular Spectroscopy Laboratory, [Retrieved Aug. 13, 2019], Internet <http://www2.riken.jp/lab-www/spectroscopy/research_coherence.html>.

NPL 4: "Design of a high resolution and high flux beam line for VUV angle-resolved photoemission at UVSOR-II," AIP Conference Proceedings, 879, 527, 2007.

SUMMARY

Technical Problem

Embodiments of the present invention can solve the above problems and it is an object of embodiments of the present invention to provide a small-scale spectroscopic measurement apparatus capable of realizing spectroscopic measurement with a high energy resolution in the vacuum ultraviolet region.

Means for Solving the Problem

A spectroscopic measurement apparatus of embodiments of the present invention includes a pulsed laser light source that emits pulsed laser light, a beam splitter that splits the pulsed laser light into first light and second light, a delay circuit that changes a delay time of the first light with respect to the second light, a chopper that intensity-modulates the first light, a wavelength converter that wavelength-converts the second light into vacuum ultraviolet light, an optical system configured to guide the first light that is intensity-modulated and the second light that is wavelength-converted to a sample to be measured installed in a vacuum chamber, and a detector that detects the second light reflected by the sample or the second light transmitted through the sample.

Effects of Embodiments of the Invention

According to embodiments of the present invention, spectroscopic measurement with a high energy resolution can be realized in the vacuum ultraviolet region by an apparatus of a scale that can be constructed in a laboratory.

BRIEF DESCRIPTION OF THE DRAWINGS

FIG. 1 is a block diagram illustrating a configuration of a spectroscopic measurement apparatus according to an embodiment of the present invention.

DETAILED DESCRIPTION OF ILLUSTRATIVE EMBODIMENTS

Figure 2:
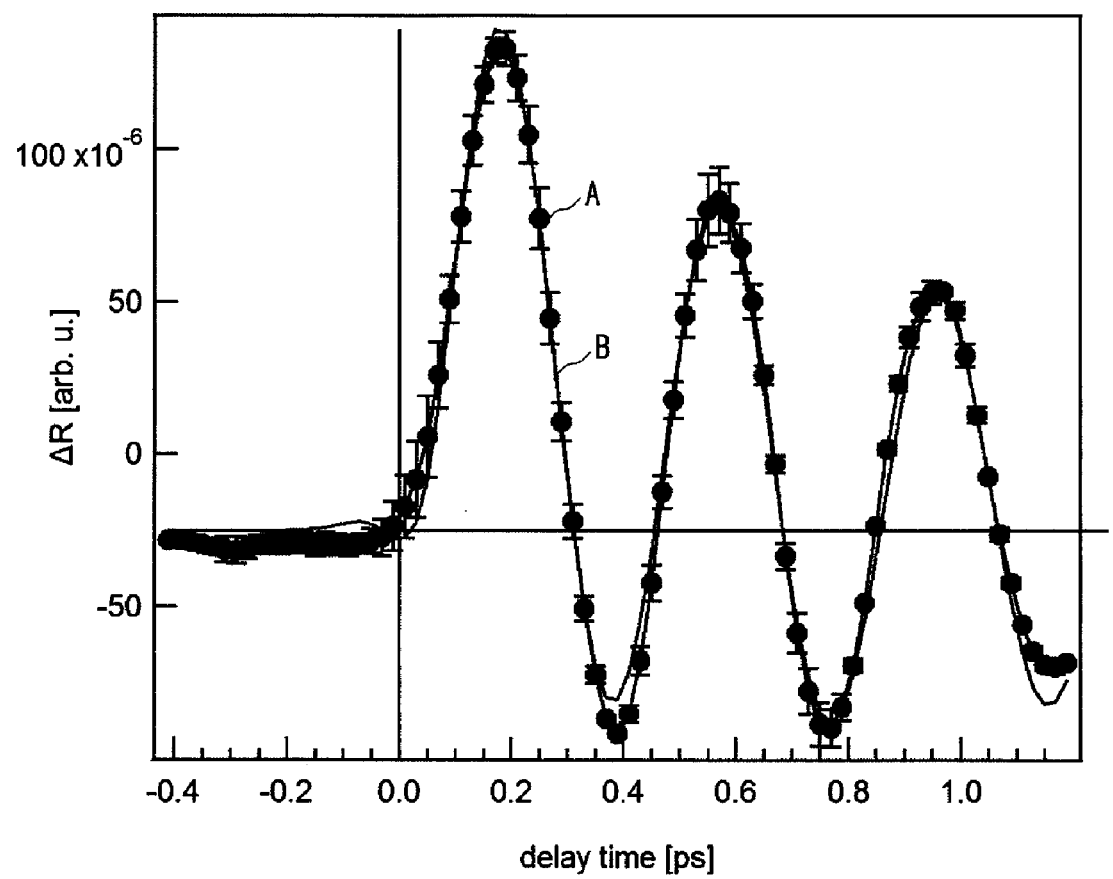
FIG. 2 is a diagram illustrating measurement results of an embodiment of the present invention.

In embodiments of the present invention, measurement is performed by the following procedures to realize spectroscopic measurement with a high energy resolution in the VUV region in a laboratory.

(Procedure 1) A high-intensity ultrashort pulsed laser that can be handled in a laboratory is used and ultrashort pulsed VUV light obtained through a high-order harmonics process (HHG) is used.

(Procedure 2) The natural frequency and lifetime of each quantum state are determined by pump-probe spectroscopy using ultrashort pulsed VUV light obtained in procedure 1. In embodiments of the present invention, the apparatus can be miniaturized because no spectroscope is used. The energy resolution is determined by the range of the delay time difference between the pump light and the probe light. The upper limit of detectable energy is determined by the energy width of the pump light and the probe light (the time width assuming a Fourier limit).

(Procedure 3) In signal detection, high-sensitivity detection is performed using a boxcar integration method and a lock-in detection method in combination. The combination of the boxcar integration method and the lock-in detection method has enabled spectroscopic measurement without relying on a high-intensity light source such as a synchrotron radiation facility.

Figure 1:
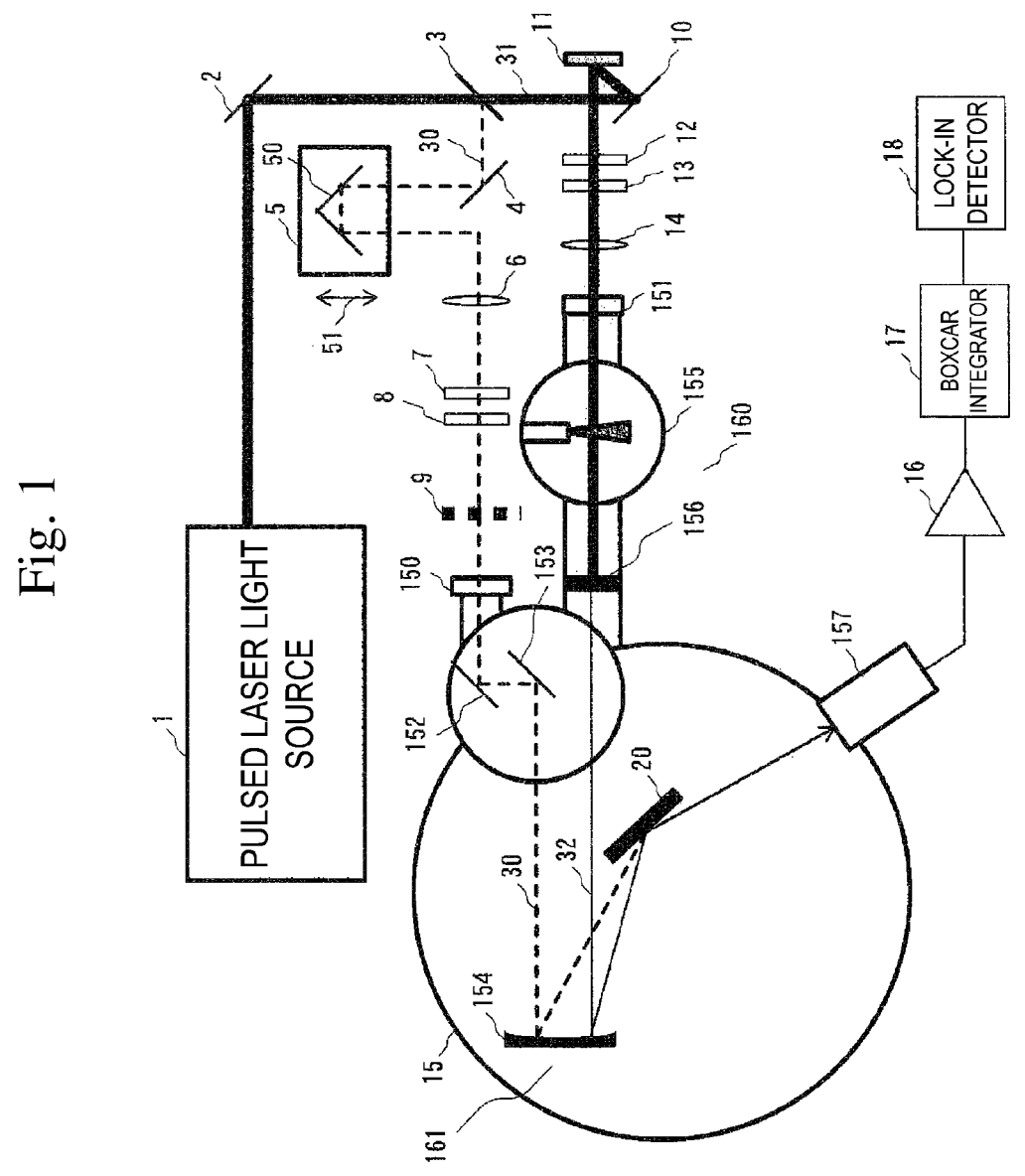

FIG. 1 is a block diagram illustrating a configuration of a spectroscopic measurement apparatus according to an embodiment of the present invention. The spectroscopic measurement apparatus includes a pulsed laser light source 1 that emits high-intensity ultrashort pulsed laser light, a mirror 2 that reflects the pulsed laser light emitted from the pulsed laser light source 1, a 2% beam splitter 3 that splits the pulsed laser light into pump light (first light) and probe light (second light), a mirror 4 that reflects the pump light, a delay circuit 5 that changes the delay time of the pump light with respect to the probe light, a lens 6 that collects the pump light, a half-wave plate 7, a polarizer 8, a chopper 9 that intensity-modulates the pump light, mirrors 10 and 11 that reflect the probe light, a half-wave plate 12, a polarizer 13, a lens 14 that collects the probe light, and a vacuum chamber 15 in which a sample to be measured is installed.

The spectroscopic measurement apparatus further includes a current amplifier 16 that amplifies the output of a detector which will be described later, a boxcar integrator 17 that integrates an output signal of the detector using a synchronization signal of a repeating pulse train of the pulsed laser light source 1 as a trigger signal, and a lock-in detector 18 that detects a signal having a modulation frequency of the chopper 9 from an integration signal obtained by the boxcar integrator 17. The total length of the spectroscopic measurement apparatus of FIG. 1 is 5 m.

The vacuum chamber 15 includes a window 150 for introducing pump light, a window 151 for introducing probe light, mirrors 152 and 153 that reflect pump light, a concave mirror 154 that reflects the pump light and the probe light to guide the pump light and the probe light to a sample 20 in the vacuum chamber 15, a rare gas introduction section 155, a thin metal film filter 156, and a detector 157 that detects the probe light reflected by the sample 20. The rare gas introduction section 155 and the thin metal film filter 156 constitute a wavelength converter 160 that wavelength-converts the probe light into vacuum ultraviolet light. The mirrors 152 and 153 and the concave mirror 154 constitute an optical system 161 that guides the pump light and the probe light to the sample 20.

A commercially available product having a repetition frequency of 3 kHz, energy per pulse of 2.2 mJ/pulse, a center wavelength of 780 nm, and a time width of 20 fs was used as the pulsed laser light source 1. Pulsed laser light emitted from the pulsed laser light source 1 is incident on the 2% beam splitter 3 via the mirror 2 and is split into pump light 30 and probe light 31 by the 2% beam splitter 3.

The pump light 30 is incident on the chopper 9 via the mirror 4, the delay circuit 5, the lens 6, the half-wave plate 7, and the polarizer 8. The delay circuit 5 includes a retroreflector 50 and reflects the incident pump light 30 in a direction parallel to and opposite to the incident direction. Then, the delay circuit 5 can change the optical path length (delay time) of the pump light 30 by moving the retroreflector 50 in the direction of an arrow 51. The delay circuit 5 can make a time difference between the pump light 30 and the probe light 31. The half-wave plate 7 and the polarizer 8 can adjust the polarization and intensity of the pump light 30.

The chopper 9 intensity-modulates (on-off-modulates) the pump light 30 at a frequency that is half the repetition frequency of the pulsed laser light source 1. Then, the pump light 30 is introduced into the vacuum chamber 15 through the window 150 and is incident on the sample 20 to be measured via the mirrors 152 and 153 and the concave mirror 154. The focal length of the concave mirror 154 is 250 mm.

On the other hand, the probe light 31 passes through the mirrors 10 and 11, the half-wave plate 12, the polarizer 13, and the lens 14. The half-wave plate 12 and the polarizer 13 can adjust the polarization and intensity of the probe light 31. For example, the polarization direction of the probe light 31 is adjusted to be perpendicular to the polarization direction of the pump light 30. The probe light 31 collected by the lens 14 is introduced into the vacuum chamber 15 through the window 151.

A rare gas is introduced into the rare gas introduction section 155 of the vacuum chamber 15. In the present embodiment, Ar gas is used as the rare gas. When the probe light 31 is incident on the rare gas in the rare gas introduction section 155, the probe light 31 is wavelength-converted by the HHG phenomenon to generate ultrashort pulsed VUV light which is a high-order harmonic. The generated ultrashort pulsed VUV light is separated from a fundamental wave having a wavelength of 780 nm by passing through the thin metal film filter 156. In the present embodiment, Al with a film thickness of 300 nm is used as the thin metal film filter 156. The ultrashort pulsed VUV light that has passed through the thin metal film filter 156 is used as probe light 32.

The probe light 32 is incident on the sample 20 via the concave mirror 154 in the vacuum chamber 15. The probe light 32 reflected by the sample 20 is incident on the detector 157 installed in the vacuum chamber 15 and is converted into an electric signal. In the present embodiment, a photomultiplier tube is used as the detector 157. The current amplifier 16 amplifies a photocurrent output from the detector 157 and converts it into a voltage.

The boxcar integrator 17 integrates the output signal of the current amplifier 16 using the synchronization signal of the repeating pulse train of the pulsed laser light source 1 as a trigger signal. The lock-in detector 18 uses a drive signal of the chopper 9 as a reference signal. The lock-in detector 18 detects a signal having the frequency of the reference signal (the modulation frequency of the chopper 9) from an integration signal obtained by the boxcar integrator 17. Such processing of the integration signal obtained by the boxcar integrator 17 through the lock-in detector 18 synchronized with the chopper 9 allows only a modulation component of the pump light to be detected as a function of the delay time generated by the delay circuit 5. A computer (not illustrated) controls the delay circuit 5 and acquires the signal of the lock-in detector 18 as a function of the delay time.

FIG. 2 illustrates measurement results when bismuth (Bi) having a film thickness of 200 nm was used as the sample 20. The vertical axis of FIG. 2 is the time change of the reflectance of the probe light 32 and the horizontal axis is the time difference between the pump light 30 and the probe light 31 and 32 (the delay time generated by the delay circuit 5). The reflectance of the probe light 32 can be calculated based on the intensity of the reflected light indicated by the output of the lock-in detector 18 and the known intensity of the probe light 32 incident on the sample 20. Circles A in FIG. 2 show measurement results obtained from the output of the lock-in detector 18 and a curve B shows results obtained through fitting. The periodic vibration components of the measurement results are derived from an A1 g optical phonon mode of Bi. The time change ΔR of the reflectance of the probe light 32 can be expressed by equation (1).

Equation (1)

$$\Delta R = A_{ph} \exp(\Gamma_{ph} t)\cos(\omega_{ph} t + \varphi_{ph}) \tag{1}$$

In equation (1), t is the time difference between the pump light 30 and the probe light 31 and 32, $A_{ph}$ is the initial amplitude of the phonon, $\omega_{ph}$ is the frequency of the phonon, $\Gamma_{ph}$ is the relaxation time of the phonon, and $\varphi_{ph}$ is the phase of the phonon. The initial amplitude $A_{ph}$, the frequency $\omega_{ph}$, the relaxation time $\Gamma_{ph}$, and the phase $\varphi_{ph}$ of the phonon were obtained by performing fitting such that equation (1) matched the measurement results.

Figure 3:
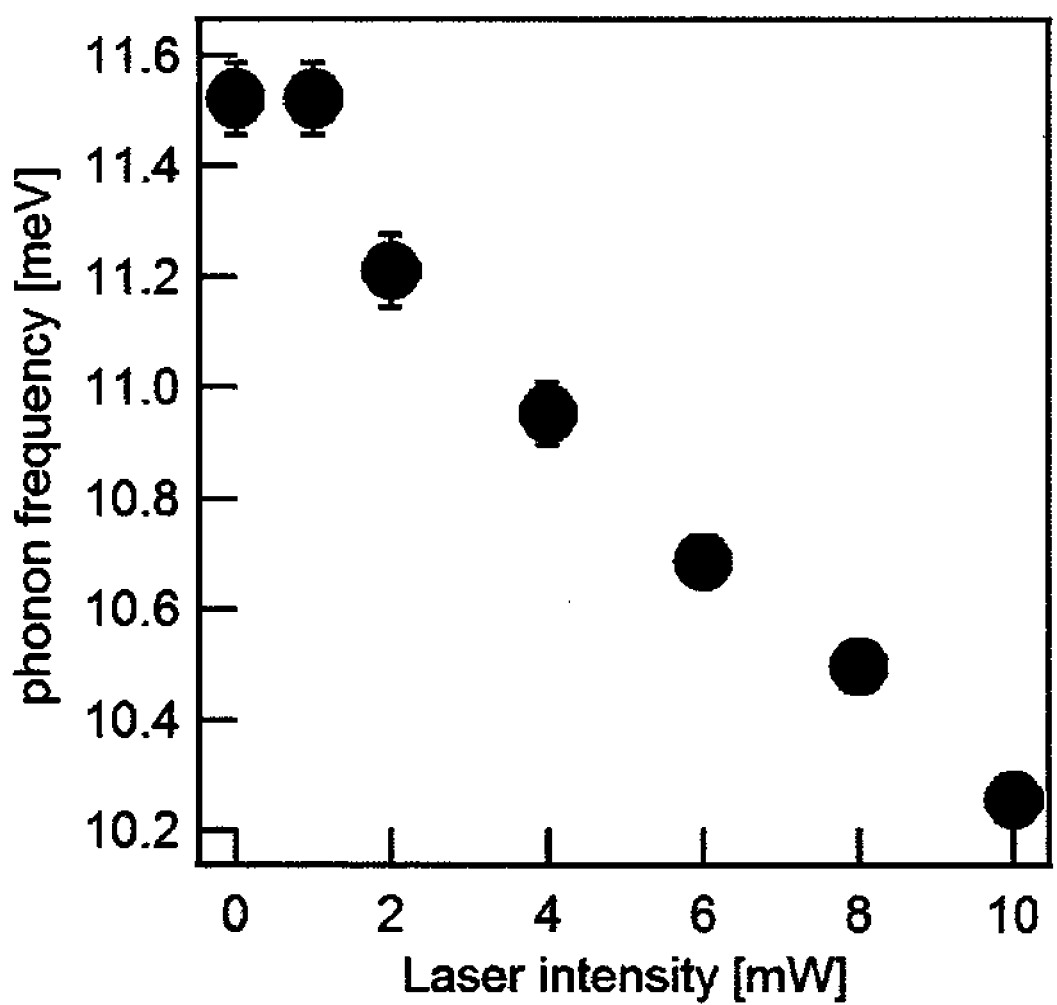
FIG. 3 is a diagram illustrating a result of plotting the frequency of phonons with respect to the intensity of pump light.
Figure 4:
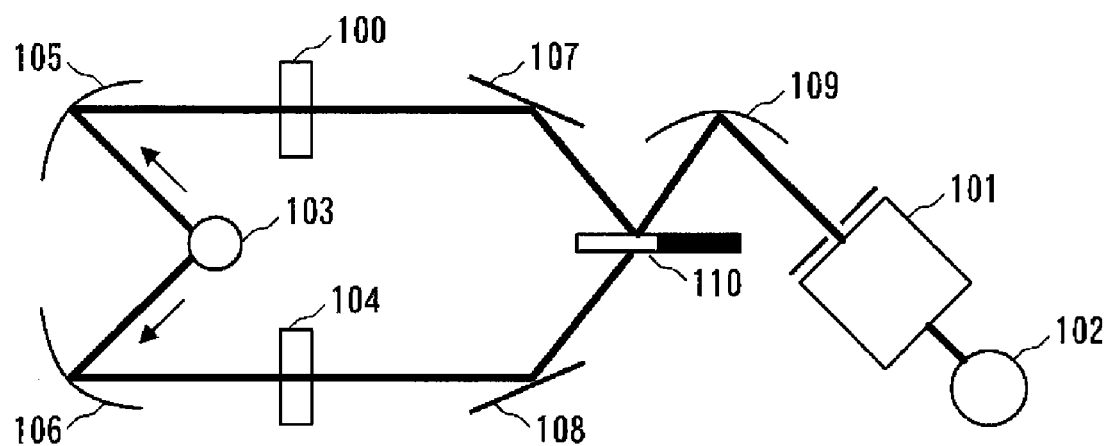
FIG. 4 is a block diagram illustrating a configuration of a dispersion type spectroscopic measurement apparatus of the related art.
Figure 5:
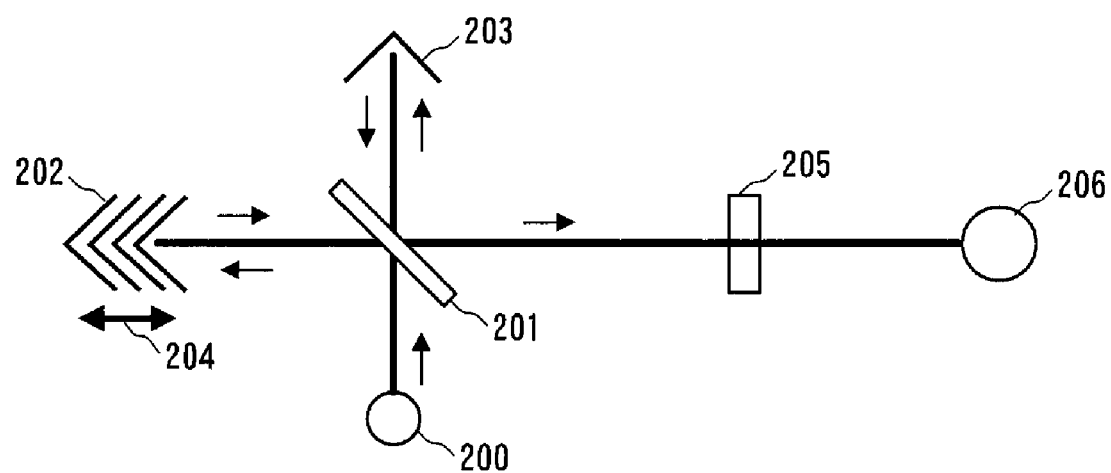
FIG. 5 is a block diagram illustrating a configuration of an interference type spectroscopic measurement apparatus of the related art.
Figure 6:
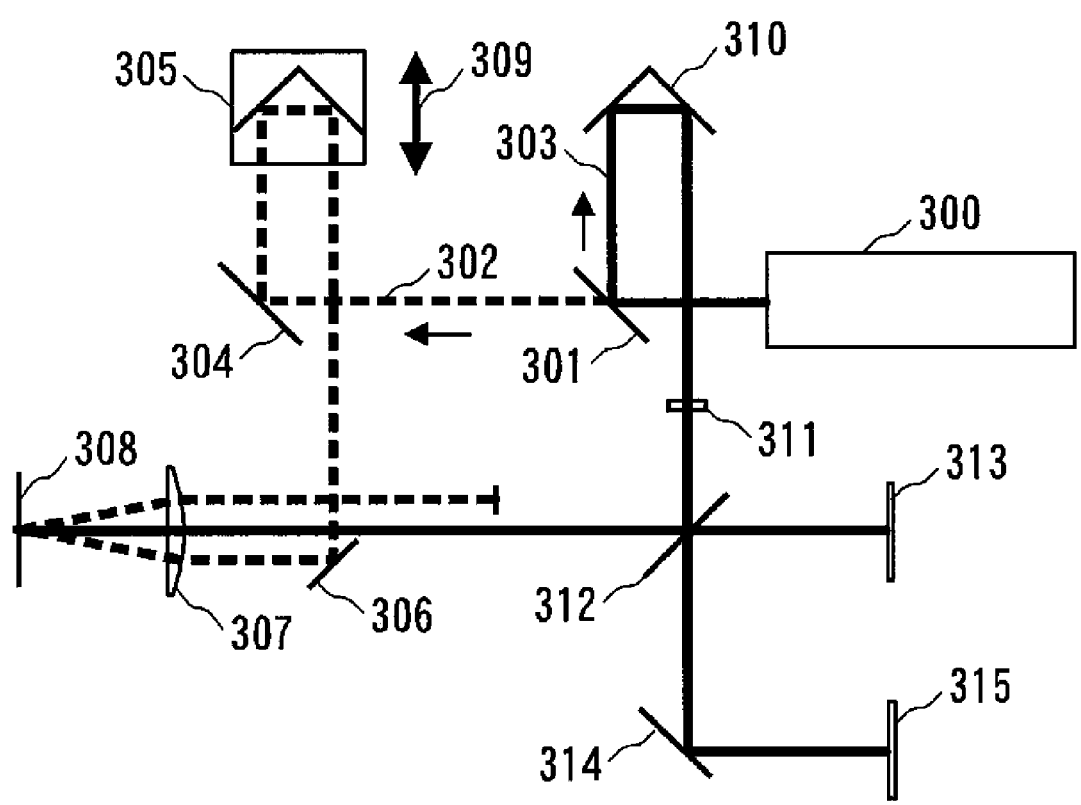
FIG. 6 is a block diagram illustrating a configuration of a spectroscopic measurement apparatus of the related art using a pump-probe method.

FIG. 3 illustrates a result of plotting the frequency of phonons with respect to the intensity of the pump light 30. From FIG. 3, it can be seen that phonons with energy (frequency) of 11 meV can be observed. It can also be seen that frequency shifts of about 0.2 meV can be systematically observed according to the pump light intensity dependence of the phonon frequency illustrated in FIG. 3.

In the present embodiment, it was possible to quantitatively evaluate the change in energy of 0.2 meV with respect to the energy of 20 eV of the probe light 32. That is, according to the present embodiment, it is possible to realize spectroscopic measurement with a high energy resolution in the VUV region.

A large spectroscope of 10 m and a high-intensity light source (a synchrotron radiation facility) were required to obtain the same result as in the present embodiment by the dispersion type apparatus using the spectroscope of the related art. On the other hand, in the present embodiment, spectroscopic measurement with a high energy resolution can be realized by an apparatus of a scale that can be constructed in a laboratory.

Application targets of the present embodiment are observable if pump light can create a superposition of two or more quantum states in a system (regarding electrons, vibrations, or rotations) forming quantum states. The energy resolution of the present embodiment is determined by the length (delay time) of the delay circuit 5. In the related art, the energy resolution is determined, for example, by an optical element used in a spectroscope such as a diffraction grating and thus there is a problem that the spectroscopic measurement apparatus becomes large when the energy of the probe light becomes high. On the other hand, in the present embodiment, the total length of the spectroscopic measurement apparatus is within 5 m and the apparatus has been successfully miniaturized.

In the present embodiment, the lower limit of observable energy is determined by the length of the delay circuit 5 because there is no influence of fluorescence or Rayleigh scattering, unlike the dispersion type apparatus using the spectroscope of the related art. Specifically, lengthening the delay time of the delay circuit 5 decreases the lower limit of observable energy. The upper limit of observable energy is determined by the energy width of the pump light (the time width assuming a Fourier limit). Specifically, shortening the pulse width of the pump light increases the upper limit of observable energy.

Although the present embodiment is configured such that light reflected from the sample is detected by the detector, the present invention can also be applied to a configuration in which light transmitted through the sample is detected by the detector. When reflected light or transmitted light can be obtained from the sample, it is possible to achieve the versatility of being able to perform measurement regardless of the state of the sample (gas, liquid, or solid).

When light from the sample is not separated, the polarization of the probe light 32 can be freely set for the sample. In the dispersion type apparatus using the spectroscope of the related art, the polarization of the probe light must be set such that the intensity of diffraction is high for the diffraction grating. In the present embodiment, the light from the sample can also be detected after being separated by a diffraction grating or the like.

Further, in the present embodiment, the energy of the probe light can be selected by changing the type of gas used for HHG (such as He, Ne, Ar, Kr, or Xe) and the type of the thin metal film filter 156 (such as Al, Ti, or Be).

INDUSTRIAL APPLICABILITY

Embodiments of the present invention can be applied to spectroscopic measurement in the vacuum ultraviolet region.

REFERENCE SIGNS LIST

1 Pulsed laser light source
2, 4, 10, 11, 152, 153 Mirror
3 2% Beam splitter
5 Delay circuit
6, 14 Lens
7, 12 Half-wave plate
8, 13 Polarizer
9 Chopper
15 Vacuum chamber
16 Current amplifier
17 Boxcar integrator
18 Lock-in detector
20 Sample
30 Pump light
31, 32 Probe light
150, 151 Window
154 Concave mirror
155 Rare gas introduction section
156 Thin metal film filter
157 Detector
160 Wavelength converter
161 Optical system

The invention claimed is:

1. A spectroscopic measurement apparatus comprising:
a pulsed laser light source configured to emit pulsed laser light;
a beam splitter configured to split the pulsed laser light into first light and second light;
a delay circuit configured to change a delay time of the first light with respect to the second light;
a chopper configured to intensity-modulate the first light;
a wavelength converter configured to wavelength-convert the second light into vacuum ultraviolet light;
an optical system configured to guide the first light that is intensity-modulated and the second light that is wavelength-converted to a sample to be measured, wherein the sample is disposed in a vacuum chamber, and wherein a concave mirror of the optical system is disposed in the vacuum chamber and is configured to guide the first light and the second light to the sample; and
a detector configured to detect the second light reflected by the sample or the second light transmitted through the sample.

2. The spectroscopic measurement apparatus according to claim 1, further comprising:
a boxcar integrator configured to integrate an output signal of the detector using a synchronization signal of a repeating pulse train of the pulsed laser light source as a trigger signal; and
a lock-in detector configured to detect a signal having a modulation frequency of the chopper from a signal integrated by the boxcar integrator.

3. The spectroscopic measurement apparatus according to claim 2, wherein the wavelength converter comprises:
a rare gas introduction section configured to introduce a rare gas into a container; and
a thin metal film filter configured not to pass light other than vacuum ultraviolet light generated by incidence of the second light from the beam splitter on the rare gas.

4. The spectroscopic measurement apparatus according to claim 1, wherein the wavelength converter comprises:
a rare gas introduction section configured to introduce a rare gas into a container; and
a thin metal film filter configured not to pass light other than the vacuum ultraviolet light generated by incidence of the second light from the beam splitter on the rare gas.

5. A method of operating a spectroscopic measurement apparatus, the method comprising:
splitting pulsed laser light from a pulsed laser light source into first light and second light using a beam splitter;
changing a delay time of the first light with respect to the second light using a delay circuit;
intensity-modulating the first light using a chopper;
wavelength-converting the second light into vacuum ultraviolet light using a wavelength converter;
guiding the first light that is intensity-modulated and the second light that is wavelength-converted to a sample to be measured using an optical system, wherein the sample is disposed in a vacuum chamber, and wherein a concave mirror of the optical system is disposed in the vacuum chamber and guides the first light and the second light to the sample; and
detecting the second light reflected by the sample or the second light transmitted through the sample using a detector.

6. The method according to claim 5, further comprising:
integrating an output signal of the detector using a synchronization signal of a repeating pulse train of the pulsed laser light source as a trigger signal using a boxcar integrator; and
detecting a signal having a modulation frequency of the chopper from a signal integrated by the boxcar integrator using a lock-in detector.

7. The method according to claim 6, further comprising:
introducing a rare gas into a container using a rare gas introduction section; and
passing the vacuum ultraviolet light generated by incidence of the second light from the beam splitter on the rare gas using a thin metal film filter, wherein the thin metal film filter blocks other light.

8. The method according to claim 5, further comprising:
introducing a rare gas into a container using a rare gas introduction section; and
passing the vacuum ultraviolet light generated by incidence of the second light from the beam splitter on the rare gas using a thin metal film filter, wherein the thin metal film filter blocks other light.

9. The method according to claim 5, wherein intensity-modulating the first light using the chopper is performed after changing the delay time of the first light with respect to the second light.

10. The method according to claim 5, wherein the detector comprises a photomultiplier tube, and wherein the method further comprises:
outputting a photocurrent from the photomultiplier tube to a current amplifier; and
amplifying the photocurrent and converting the amplified photocurrent into a voltage using the current amplifier.

11. The spectroscopic measurement apparatus according to claim 1, wherein the chopper is configured to intensity-modulate the first light after the delay time of the first light is delayed by the delay circuit.

12. The spectroscopic measurement apparatus according to claim 1, wherein the detector comprises a photomultiplier tube configured to output a photocurrent to a current amplifier, and wherein the current amplifier is configured to amplify the photocurrent and convert the amplified photocurrent into a voltage.

* * * * *